(12) United States Patent
Messerly et al.

(10) Patent No.: US 9,166,355 B2
(45) Date of Patent: Oct. 20, 2015

(54) DIRECTLY DRIVEN SOURCE OF MULTI-GIGAHERTZ, SUB-PICOSECOND OPTICAL PULSES

(75) Inventors: Michael J. Messerly, Danville, CA (US); Jay W. Dawson, Livermore, CA (US); Christopher P. J. Barty, Hayward, CA (US); David J. Gibson, San Francisco, CA (US); Matthew A. Prantil, San Ramon, CA (US); Eric Cormier, Cestas (FR)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/343,706

(22) PCT Filed: Sep. 12, 2012

(86) PCT No.: PCT/US2012/054872
§ 371 (c)(1),
(2), (4) Date: Jun. 2, 2014

(87) PCT Pub. No.: WO2013/040041
PCT Pub. Date: Mar. 21, 2013

(65) Prior Publication Data
US 2014/0300951 A1 Oct. 9, 2014

Related U.S. Application Data

(60) Provisional application No. 61/533,700, filed on Sep. 12, 2011.

(51) Int. Cl.
*H01S 3/00* (2006.01)
*H01S 3/067* (2006.01)
*H01S 3/30* (2006.01)
*H01S 3/23* (2006.01)
*H01S 3/10* (2006.01)

(52) U.S. Cl.
CPC ............. *H01S 3/0085* (2013.01); *H01S 3/0057* (2013.01); *H01S 3/06754* (2013.01); *H01S 3/06758* (2013.01); *H01S 3/30* (2013.01); *H01S 3/10046* (2013.01); *H01S 3/2383* (2013.01)

(58) Field of Classification Search
CPC ........ H01S 3/0057; H01S 3/11; H04B 10/508
USPC ......................................................... 359/333
See application file for complete search history.

(56) References Cited

U.S. PATENT DOCUMENTS 5,847,863 A     12/1998  Galvanauskas et al.
8,798,107 B2 *  8/2014   Deladurantaye et al. ....... 372/25
(Continued)

OTHER PUBLICATIONS

International Search Report and Written Opinion for PCT/US12/054872 related to U.S. Appl. No. 14/343,706, 9 pages, Feb. 2013.

*Primary Examiner* — Mark Hellner
(74) *Attorney, Agent, or Firm* — John P. Wooldridge

(57) ABSTRACT

A robust, compact optical pulse train source is described, with the capability of generating sub-picosecond micro-pulse sequences, which can be periodic as well as non-periodic, and at repetition rates tunable over decades of baseline frequencies, from MHz to multi-GHz regimes. The micro-pulses can be precisely controlled and formatted to be in the range of many ps in duration to as short as several fs in duration. The system output can be comprised of a continuous wave train of optical micro-pulses or can be programmed to provide gated bursts of macro-pulses, with each macro-pulse consisting of a specific number of micro-pulses or a single pulse picked from the higher frequency train at a repetition rate lower than the baseline frequency. These pulses could then be amplified in energy anywhere from the nJ to MJ range.

37 Claims, 8 Drawing Sheets

(56) References Cited

U.S. PATENT DOCUMENTS

| | | |
|---|---|---|
| 2004/0240037 A1 | 12/2004 | Harter |
| 2005/0226278 A1 | 10/2005 | Gu et al. |
| 2007/0177640 A1 | 8/2007 | Liu |
| 2011/0007760 A1 | 1/2011 | Clowes et al. |

\* cited by examiner

DIRECTLY DRIVEN SOURCE OF MULTI-GIGAHERTZ, SUB-PICOSECOND OPTICAL PULSES

CROSS-REFERENCE TO RELATED APPLICATIONS

This application claims the benefit of U.S. Provisional Patent Application No. 61/533,700, titled "Source of Directly-Synchronized, Multi-Gigahertz, Sub-Picosecond Optical Pulses," filed Sep. 12, 2011, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to short pulse laser systems, and more specifically, it relates to the production of short-pulse, high repetition-rate, high energy output pulses.

2. Description of Related Art

Very-short-pulse laser sources (in the range of picoseconds to femtoseconds), with high repetition rates (MHz to GHz) are required for many applications, including materials processing, 3-D lithography, high-data-rate laser communication, remote sensor systems, as pump sources for the realization of short-wavelength high-energy photon sources via higher-order nonlinear optical parametric interactions, and as photo-cathode illumination laser pulses for creation of photo-electrons in high frequency particle accelerators.

For certain applications there is a long felt, unmet need for a reliable and robust source of picosecond pulses at repetition rates of 10 GHz or greater driven at the exact frequency of a desired clock. A need exists for the ability to feed bursts of electrons into every cycle of an electron accelerator and thus increase brightness. It has also been desirable for the ability to feed an etalon to create super-pulses by stacking many micro-pulses. In the latter example, a 10 GHz repetition rate would enable the use of a 15 mm etalon, which is much more convenient and inherently more stable and robust than the 1.5 m etalon required for a 100 MHz source.

Continuous wave (CW) lasers have been converted to sub-ps, high frequency pulse trains, through the use of "time-lens" techniques to generate ps-level bandwidths, followed by soliton compression at 1550 nm in specially optimized fibers to generate further bandwidth while simultaneously compressing the pulse. As is known in the art, this technical approach is limited to systems at operating wavelengths whose fiber dispersion characteristic is compatible with the requirements of soliton compression, which is satisfied at 1550 nm for available fiber materials. However, at other useful operating wavelengths, say in the range of 1050 nm, the soliton compression scheme is not feasible because the dispersion in standard fibers has the opposite sign from the dispersion at 1550 nm.

The prior art also includes controllable fs pulse-train generation techniques at 1552 nm. This approach involves optical comb signal generation using overdriven RF modulation of a cw laser diode (using a Mach-Zehnder modulator), resulting in highly chirped output pulses, followed by fiber-based frequency-chirp compensation (resulting in a picosecond pulse train), which, in turn, is followed by fiber-based dispersion-flattening that compresses the ps pulse train into fs pulses. The spectral spacing is determined by the RF modulation drive frequency, while the modulation drive power determines the bandwidth of the spectrum. Under the proper modulation conditions, a parabolic dependence of each comb mode in the ensemble can be realized, which is amenable to standard single-mode fiber compensation techniques.

The prior art also includes many examples of optical fiber-based mode-locked oscillators. See, e.g., M. Fermann, M. Andrejco, Y. Silberberg, and M. Stock, "Passive mode locking by using nonlinear polarization evolution in a polarization-maintaining erbium-doped fiber," Opt. Lett. 18, 894-896 (1993). Such oscillators can produce pulses that, after passing through a following fiber-based or grating-based compressor, can have sub-picosecond durations. The pulse repetition rate of such oscillators is generally limited however to less than 100 Mhz, since higher repetition rates would require lengths of optical fiber that are impractically short. Moreover, such oscillators are inherently sensitive to vibration, and cannot be made as reliable and robust as can the pulse source described here.

The prior art also includes examples where the frequency of sources of sub-picosecond pulses having modest repetition rates are locked to a sub-multiple of some desired higher frequency clock; for example, a 100 MHz source might be locked to the $100^{th}$ sub-multiple of a 10 GHz clock. Such sub-multiple locking schemes are difficult to implement, however, and are prone to drift and noise-related imperfections.

The ability to programmably modify the temporal pulse shape and its amplitude, in real time, would offer the possibility of controlling various complex photochemical processes and quantum control of interactions on molecular time scales. It is desirable to use self phase modulation of a seed beam to produce a train of bandwidth-limited short-duration output pulses and further, to produce a train of short-pulse, high repetition-rate, high energy output pulses.

SUMMARY OF THE INVENTION

The invention provides methods and apparatuses that use self phase modulation to produce a train of bandwidth-limited short-duration output pulses. Generally, a continuous wave (CW) laser provides a CW laser beam that is modulated by at least one electro-optic modulator to produce a high repetition rate seed beam which is then amplified to produce an amplified seed beam. Self phase modulation (SPM) of the amplified seed beam produces the desired train of bandwidth-limited short-duration output pulses from the amplified seed beam. This train of bandwidth-limited short-duration output pulses can be further amplified to produce amplified pulses that are compressed to produce the desired train of short-pulse, high repetition-rate, high energy output pulses.

A spectral broadener that utilizes SPM for broadens the optical spectrum of the amplified seed beam to produce a spectrally broadened beam which is then compressed to produce the desired train of bandwidth-limited short-duration output pulses. In some embodiments, the electro-optic modulator is configured for modulating the CW beam at a radio-frequency. A parabolic drive signal can be used to drive the electro-optic modulator. In some cases, two modulators are used, and in some embodiments, the first modulator creates a very high frequency stream of micro-pulses and the second modulator carves pulse bunches from the stream and operates at a lower frequency than the first modulator and may be gated for a predetermined interval of time to produce macro-pulses. Exemplary embodiments provide the first modulator to be driven at a frequency >2 GHz and the second modulator to be driven at a frequency >10 KHz, and where the second modulator is gated to allow >100 pulses per macro-pulse.

Often, the optical amplifier is an optical fiber amplifier, SPM is accomplished with a nonlinear optical fiber and a pair of dispersive elements, such as a pair of diffraction gratings, are used to compress the spectrally broadened beam. In some cases, the spectral broadener is a nonlinear optical fiber selected to preferentially attenuate light that would otherwise be generated by nonlinear stimulated Raman scattering.

Depending on the application and desired output, a variety of embodiments are provided. For example, the parabolic drive signal that drives the EO modulator may be periodic in time, aperiodic in time or arbitrary in time. An optical limiter may be positioned between the fiber amplifier and the pulse broadener, wherein the optical limiter is configured to produce substantially uniform intensity pulses in a plurality of pulses of the amplified seed beam. Wavelengths from the CW laser may be within a range within a range from 1000 nm to 2000 nm. The high repetition rate seed beam may have a repetition rate of at least 2 GHz. In some embodiments, the electro-optic modulator is configured to produce a high repetition rate seed beam having a repetition rate within a range from 1 GHz to 100 GHz. Short-pulse, high repetition-rate, high energy output pulses produced by this invention may have a pulse duration within a range from 10 fs to 1 ps, a repetition rate within a range from 1 GHz to 100 GHz and energy within a range from 100 µJ to 1 µJ. In other embodiments, the short-pulse, high repetition-rate, high energy output pulses may have a pulse duration within a range from 10 fs to 1 ps, a repetition rate within a range from 1 GHz to 100 GHz and energy within a range from 1 µJ to 10 mJ.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
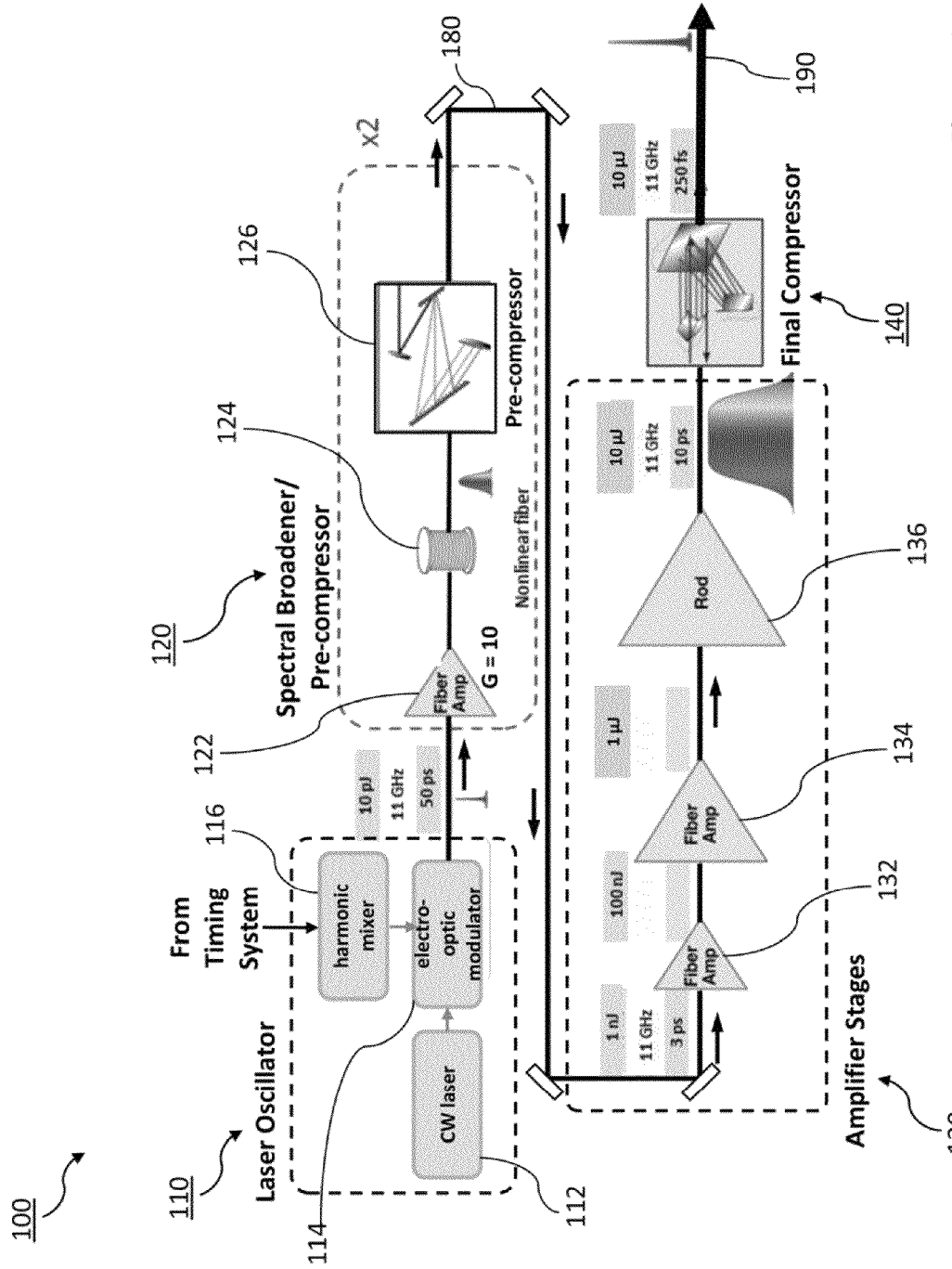
FIG. 1 depicts a basic system capable of generating tunable, multi-GHz, sub-picosecond optical pulse trains using a modulated cw laser as an input pulse train.

The embodiments described herein teach several basic modular approaches to realize a real-time, programmable optical arbitrary waveform pulse generator. This modular approach affords the possibility to scale the system to very high output powers as well as to coherently combine the outputs of a serial-parallel system architecture.

An embodiment involves a low-power laser master oscillator pulsed beam, which subsequently drives one or more optical amplification stages, cascaded in a serial/parallel architecture, with each stage possessing the capability to broaden the optical spectrum of the pulses, to achieve the desired bandwidth-limited output pulses. In one embodiment, the desired laser pulse train is generated by modulating a continuous-wave (cw) laser with an RF source, which forms the pulsed beam. The system provides a novel source of picosecond or sub-picosecond pulses having many advantages over the prior art, including the following:

One advantage of the present invention over the prior art is that it allows for pulses at very high repetition rates, e.g., 10 GHz, but with currently-existing electronics could operate as fast as 100 GHz. By contrast, prior-art, mode locked lasers more typically operate in the 10-100 MHz range.

Another advantage is that since it is driven directly by an RF source, its frequency can be stabilized (locked) more easily and likely more precisely than can the cavity of a laser. Precision frequency control is essential for applications whereby the laser pulse repetition rate must be locked precisely to a system drive frequency, an example of which is an 11.424 GHz (x-band) accelerator.

An additional advantage is that the resulting system is much more robust to environmental perturbations than a mode-locked laser.

Yet another advantage is that the nonlinear broadening of the pulse spectrum, and the concomitant temporal-shortening of the pulses, is made possible by the large pulse energies one can achieve at 1040 nm (in the window of Yb-doped gain fibers). We have demonstrated that this nonlinear effect can reduce the duration of pulses from 50 ps (as driven by the modulator) to less than 1 ps (after the nonlinear effect and compression). In principle, yet shorter pulse widths, in the range of 100 fs or below, are possible for systems that can circumvent the deleterious effects due to stimulated Raman scattering.

High energy/high power systems would be able to utilize this technology near 1 micron, as the tunable CW laser could span a range of wavelengths from 1020-1080 nm, with a simple and rapid adjustment to the tunable laser to match the peak of bulk amplifier systems.

In the prior art, cw lasers have been converted to sub-ps, high frequency pulse trains, through the use of "time-lens" techniques to generate ps-level bandwidths, followed by soliton compression at 1550 nm in specially optimized fibers to generate further bandwidth while simultaneously compressing the pulse. As is known in the art, this technical approach is limited to systems at operating wavelengths whose fiber dispersion characteristic is compatible with the requirements of soliton compression, which is satisfied at 1550 nm for available fiber materials. However, at other useful operating wavelengths, say in the range of 1050 nm, the soliton compression scheme is not feasible because the dispersion in standard fibers has the opposite sign from the dispersion at 1550 nm.

The prior art also includes controllable femtosecond pulse-train generation techniques at 1552 nm. This approach involves optical comb signal generation using overdriven RF modulation of a cw laser diode (using a Mach-Zehnder modulator), resulting in highly chirped output pulses, followed by fiber-based frequency-chirp compensation (resulting in a picosecond pulse train), which, in turn, is followed by fiber-based dispersion-flattening that compresses the picosecond pulse train into femtosecond pulses. The spectral spacing is determined by the RF modulation drive frequency, while the modulation drive power determines the bandwidth of the spectrum. Under the proper modulation conditions, a parabolic dependence of each comb mode in the ensemble can be realized, which is amenable to standard single-mode fiber compensation techniques.

Some embodiments discussed herein involve an RF modulated low-power laser master oscillator beam, which drives one or more optical pre-amplification stages, cascaded in a serial architecture, with each stage possessing the capability to broaden the optical spectrum of the pulses, to achieve the desired bandwidth-limited output pulses. The pulse train is subsequently amplified by a power amplifier chain, followed by a final pulse compression network, resulting in the desired short-pulse, high repetition-rate, high energy output wave train. Provisions are also discussed to enable precision control of the pulse-forming networks, frequency scaling, temporal stacking of the output wave train and techniques to suppress stimulated Raman scattering processes, the latter of which can deleteriously affect the optical output pulse shape and limit the energy output of the system.

Turning now to FIG. 1, an exemplary embodiment of the invention is shown. The basic system 100 is comprised of four modules: a master laser oscillator 110; a spectral broadening/pre-compressor network with optical gain 120; a power amplification network 130; and a final compressor 140. The master laser oscillator 110 is comprised of a continuous-wave laser 112, whose output is amplitude modulated by an electro-optic (E-O) modulator 114. The optical modulator is selected to possess a bandwidth and linear response suitable for a given end-user application. The design rules of these devices are well known in the art, an example of which can be a 40 GHz lithium niobate ($LiNbO_3$) Mach-Zehnder E-O modulator, which is commercially available.

The desired modulation signal is imposed onto the E-O modulator by a harmonic mixer 116, synchronized to an overall system master clock. The harmonic mixer provides the desired optical modulator drive signal by synthesizing a pulse train via the coherent mixing of phasors, which are derived from the master clock fundamental frequency and harmonics thereof, and with each phasor possessing a specified amplitude and relative phase.

The resultant modulation drive signal is typically in the form of a well-defined wave-train sequence of electronic pulses, which is emitted at regular or irregular intervals in time. The optical output of the laser oscillator 110 is a faithful replica of the drive signal. Typical laser oscillator output characteristics are comprised of a sequence of optical micro-pulses at a modulation frequency on the order of 11 GHz, whose individual optical pulses possess an energy in the range of 10 pJ, with a pulse width on the order of 50 ps.

In certain applications, it is desirable to gate the micro-pulse train in a periodic manner, with the gate signal referred to as a macro-pulse. Typical burst rates can be in the range of 10 kHz to 100 kHz, with each macro-pulse comprised, typically, of 500 micro-pulses. As before, each micro-pulse would possess an energy of 10 pJ, and of duration of 50 ps. The desired periodic macro-pulse sequence can be realized by gating the 10 GHz E-O modulator with a control pulse at the desired repetition rate (e.g., 100 kHz) and duty cycle (e.g., a duty cycle of 0.5%). In this example, the period of the macro-pulse would be 10 µs, and the gate-on duration of each macro-pulse would be ≈50 ns, resulting in a typical burst of 500 micro-pulses at a rate of 100 kHz.

The laser oscillator micro-pulse output train (or, gated macro-pulse sequence, as desired) is directed to a spectral-broadening/pre-compressor network 120. In this embodiment, two identical networks are cascaded in series. In FIG. 1, only one such network 120 is shown for ease of viewing. Each stage of this dual-modular network is comprised of an optical fiber amplifier 122, a spectral broadener 124, and a pulse compressor 126. The combined pair of optical fiber amplifiers 122 is chosen to provide a net (energy) gain in the range of 100. The amplified output pulse train is directed to a spectral broadener device 124, which, in this embodiment, is comprised of a specific length of optical fiber. It is well known in the art that a signal can be spectrally broadened upon propagation through a passive optical fiber 124 via the so-called nonlinear optical self-phase modulation (SPM) mechanism. Suffice it to say that the degree of spectral broadening is a function of the input intensity profile to the fiber (specifically the shape of the pulse and the energy), the length of fiber and the nonlinear optical index, $n_2$, of the fiber, the latter of which is a function of the materials that comprise the fiber. The spectrally broadened pulse train is then directed to a pulse compressor network 126. Pulse compressors are well known in the art and are typically comprised of a pair of dispersive elements (e.g., diffraction gratings, prisms) and beam combining/relay optical elements (e.g., lenses, mirrors).

The spectral broadening network, in conjunction with the pulse compressor, provides a passive means by which to reduce the temporal width of optical pulses. Though the spectral broadening network may increase the temporal width of the pulses, this increase is more than compensated by the temporal compressor—the broadened bandwidth allows for a more compressible temporal width. The ability to temporally compress pulses greatly relaxes the need for ultra-high bandwidth optical modulators. As an example, current modest-quality modulators cannot carve, or generate, pulses shorter than 50 ps, but nonlinear self-phase modulation/compression networks, as described in the embodiments herein, can generate pulses shorter than 1 ps.

As noted above, the embodiment shown in FIG. 1 is comprised of two identical, cascaded spectral broadener/pulse-compression stages 120. In general, the bandwidth broadening/compression can occur over one stage. An advantage of multiple bandwidth-broadening, self-phase modulation sections is that the individual pulses in a given sequence can be partially recompressed between sections to ensure that adjacent pulses do not overlap as the pulses spread in time due to dispersion in the fiber (though SPM reduces the compressed width of the pulses, chromatic dispersion increases the uncompressed width of the pulses during propagation).

As an example of the net result of the cascaded pair of modules 120 on the pulse parameters of a typical input pulse train, consider a pulse train as shown in FIG. 1. Recall, that the output of the laser oscillator module 110 is comprised of temporal sequence of pulses, at an 11 GHz repetition rate, with an energy per pulse of 10 µJ and with each pulse of temporal duration 50 ps. This modulated beam is directed into an identical pair of cascaded broadening/compression modules 120.

The output pulse train 180 that exits the pair of cascaded modules 120 will remain at an 11 GHz repetition rate, but, now, with an increased pulse energy, on the order of 1 nJ (a net gain of 100), and with a compressed pulse width of 3 ps (a net compression factor of ≈16.67).

It is well known that optical pulses with a parabolic intensity profile as a function of time (i.e., $I \propto t^2$) can develop a linear frequency chirp under the proper conditions, thereby resulting in a spectral format suitable for pulse compression. This supposition assumes that such parabolic pulses propagate through an optical fiber that experiences self-phase modulation (SPM), characterized by a parabolic phase shift, which is proportional to the product of the intensity and the refractive index, $n_2$. Hence, when properly amplified, the bandwidth of parabolic pulses tends to increase uniformly with propagation distance through a nonlinear medium, so that the resulting spectrally broadened pulses can be subsequently compressed by a linear dispersive pulse compressor to near the minimum width that their bandwidth allows.

Micro-pulses emitted by the laser oscillator module 110 with the desired intensity profiles can be obtained by synthesizing parabolic modulation drive signals, which can be applied to a high-bandwidth E-O modulator, 114. The necessary E-O drive waveform is realized using the harmonic mixer 116 shown in FIG. 1, with a suitable set of harmonic input signals. Note that in this embodiment, the fundamental frequency component is obtained via a master system synchronization clock generator (not shown), which provides input to the harmonic mixer 116.

Figure 2B:
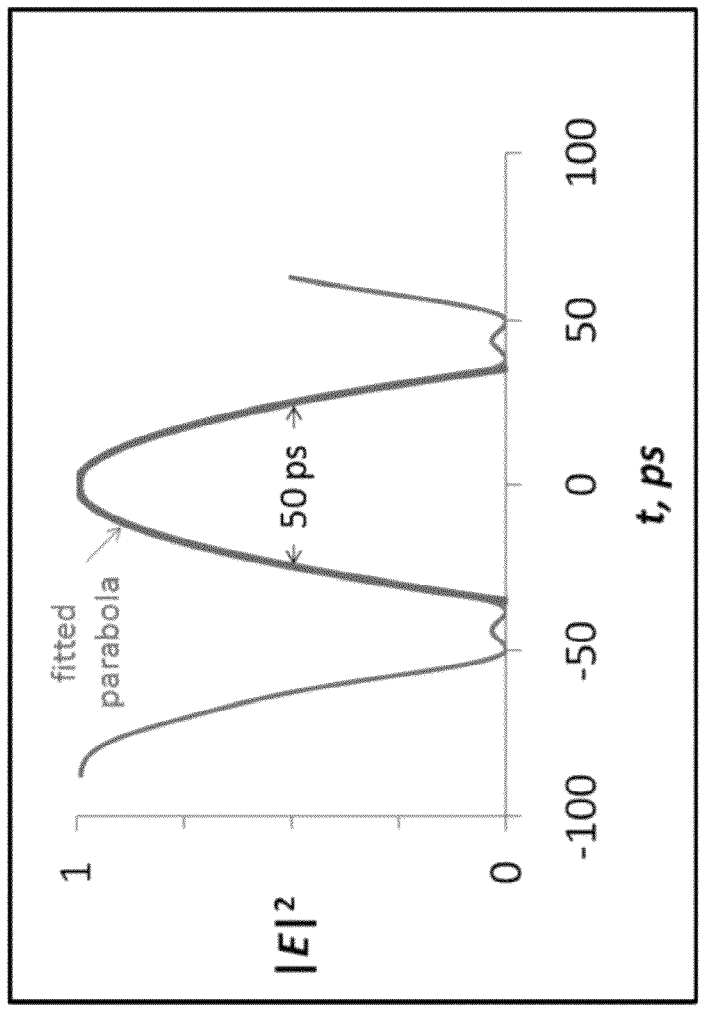
FIG. 2B shows a simulation of the near-parabolic output pulse train of a harmonic mixer, as generated using the four input signals, and, their respective phase settings, shown in FIG. 2A.
Figure 2A:
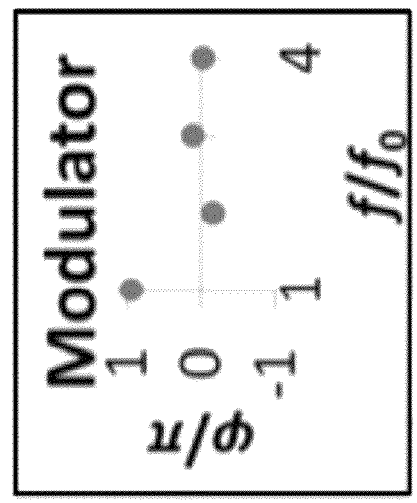
FIG. 2A shows a fundamental frequency component and its first three harmonics, including the respective relative phase settings, as input to a harmonic mixer, to generate a nearly parabolic temporal output pulse train.

Turning now to FIG. 2A and FIG. 2B, results of a numerical simulation of the harmonic mixer 116 are shown that demonstrate the ability of this device to generate an electronic pulse waveform with the requisite parabolic temporal profile. In this example, the mixer coherently combines an input fundamental frequency signal (e.g., at a nominal frequency of 11 GHz) with three respective harmonic input components. FIG. 2A shows the relative phases of the four frequency components that collectively form the parabolic drive signal. Under these conditions, the resultant output of the mixer is shown in FIG. 2B, indicating that the output drive waveform is essentially parabolic in time, with a 50 ps full-width-half-maximum (FWHM) pulse duration. This signal is used as the electronic drive input to the E-O modulator 114 shown in FIG. 1.

It is well known that the optical pulses do not have to be perfectly parabolic for self-phase modulation to broaden the bandwidth. In principle, pulses evolve to become parabolic as they propagate through a nonlinear medium. However, starting with a better approximation to parabolic pulses at the outset reduces the length of nonlinear fiber required to achieve the parabolic pulse shape, and reduces potential unwanted distortions.

Returning to FIG. 1, the amplified and narrowed pulse train 180 is then directed to an amplifier chain 130 followed by a final pulse compressor stage 140. In the embodiment shown in FIG. 1, the amplifier network is comprised of two stages of fiber amplifiers, 132 with an (energy) amplification gain of 100; and 134, with an (energy) amplification gain of 10. This is followed by a power amplifier stage 136, with a gain of 10, which can be in the form of an optically pumped solid-state gain medium. The micro-pulse optical train at the output of the amplification chain 130 remains at 11 GHz, but, now, increased to an energy of 10 µJ per micro-pulse, and with a slightly broadened micro-pulse width, in the range of ≈10 ps. Hence, the net gain of the amplification module 130 is on the order of $10^4$.

In one embodiment, the system output is comprised of a sequence of macro-pulses, which have a repetition rate in the range of kHz to MHz. Typically, each macro-pulse in the sequence is comprised of a well-defined number of 11 GHz micro-pulses, typically in the range of 500 micro-pulses. In this case, a system modality is realized, whereby the macro-pulse sequence repetitively provides a gated burst of micro-pulses.

The micro-pulse train output from the amplification stage module 130 is subsequently directed to a final compression stage 140. In the embodiment of FIG. 1, this final compression stage is designed to provide a pulse compression factor of 40. Thus, the final system output 190 will be comprised of a pulse train at an 11 GHz repetition rate within each respective macro-pulse, with an energy of ≈10 µJ per micro-pulse, and with a micro-pulse duration of 250 fs, where we have neglected losses.

In cases where the final optical output requires further pulse narrowing, the basic system shown in FIG. 1 can be augmented by adding a bandwidth broadening section (not shown) at the final output of a chain of amplifiers, an example of which can be positioned between modules 130 and 140. In this manner, the final pulse compressor 140 can, in principle, provide yet further temporal compression, since the degree of compression is fundamentally limited by the inverse of the spectral bandwidth, given that these two parameters form a set of Fourier transform conjugate variables.

Spectral broadening sections can, in principle, further benefit by designing the system to possess zero, or near zero, net chromatic dispersion. This design rules inhibits the uncompressed pulses from growing in time and, possibly, overlapping with adjacent pulses. Minimizing the chromatic dispersion can be accomplished with a pair of diffraction gratings, as well as integrated optical and fiber optic analogs, as is known to the skilled artesian.

It is to be noted that inter-stage links can be free space or guided-mode (e.g., all fiber). In the latter case, gas-filled (e.g., Xe-filled) hollow-core photonic crystal fibers can be employed, as these guided-wave structures are relatively dispersion-free, with minimal optical nonlinearities, thereby minimizing pulse distortions, and, concomitantly enabling the transmission of high-peak power pulses, etc. The fiber amplifiers can be conventional fiber amplifiers, as well as photonic crystal fiber amplifiers or gas-filled HC-PCF Raman amplifiers, with the appropriate broadband gain-linewidth profiles. Not shown in the fiber and rod amplifiers is the optical pumping apparatus, optional dispersion compensators, polarization controllers, optical isolators and couplers, which involve devices and techniques that are well known to the skilled artesian.

In an embodiment utilizing the configuration shown in FIG. 1, a 11.4 GHz fiber laser built on a modulated cw platform is described and characterized, based on a non-mode-locked source. This compact, fiber based system is driven by RF and is scalable over a wide range of drive frequencies. The system is capable of generating a periodic sequence of macro-pulses, with each macro-pulse comprised of 50 ns bursts of 575 micro-pulses, produced at a rate of 83 kHz. Each of the 575 micro-pulses is of duration 850 fs, with 1.6 nJ per pulse, at an operating wavelength of 1040 nm. In the demonstration of this cw-modulation concept reported here, we rely on self-phase modulation (SPM) to generate 3.2 nm of bandwidth and compress the spectrally broadened micro-pulse using a standard grating-pair compressor. In other measurements (not shown here), the system described below was successfully tested throughout the range of 5 GHz to 20 GHz with the same laser, RF source, amplifier chain and length of fiber.

The experimental architecture consists of a continuous-wave laser, a New Focus Velocity tunable laser, set to provide a 1040 nm wavelength output beam. The cw output is sent through an EOSPACE-brand, Z-cut, 20 GHz, dual-drive Mach-Zehnder electro-optic modulator (EOM) coupled with a feedback circuit which maintains the modulator biased to block the optical output. The modulator is driven with 20.1 dBm of 5.7 GHz RF power. Because of the null bias, the RF drives an 11.4 GHz laser micro-pulse train at the output of the modulator, each micro-pulse of which is 44 ps in duration. A second EOM slices (i.e., gates) out sharp rise and fall times at a 500 kHz pulse bunch rate with a gate-width of 50 ns in duration (i.e., a 50 ns macro-pulse). Hence, each macro-pulse contains approximately 575 micro-pulses (each micro-pulse of 44 ps).

Figure 3:
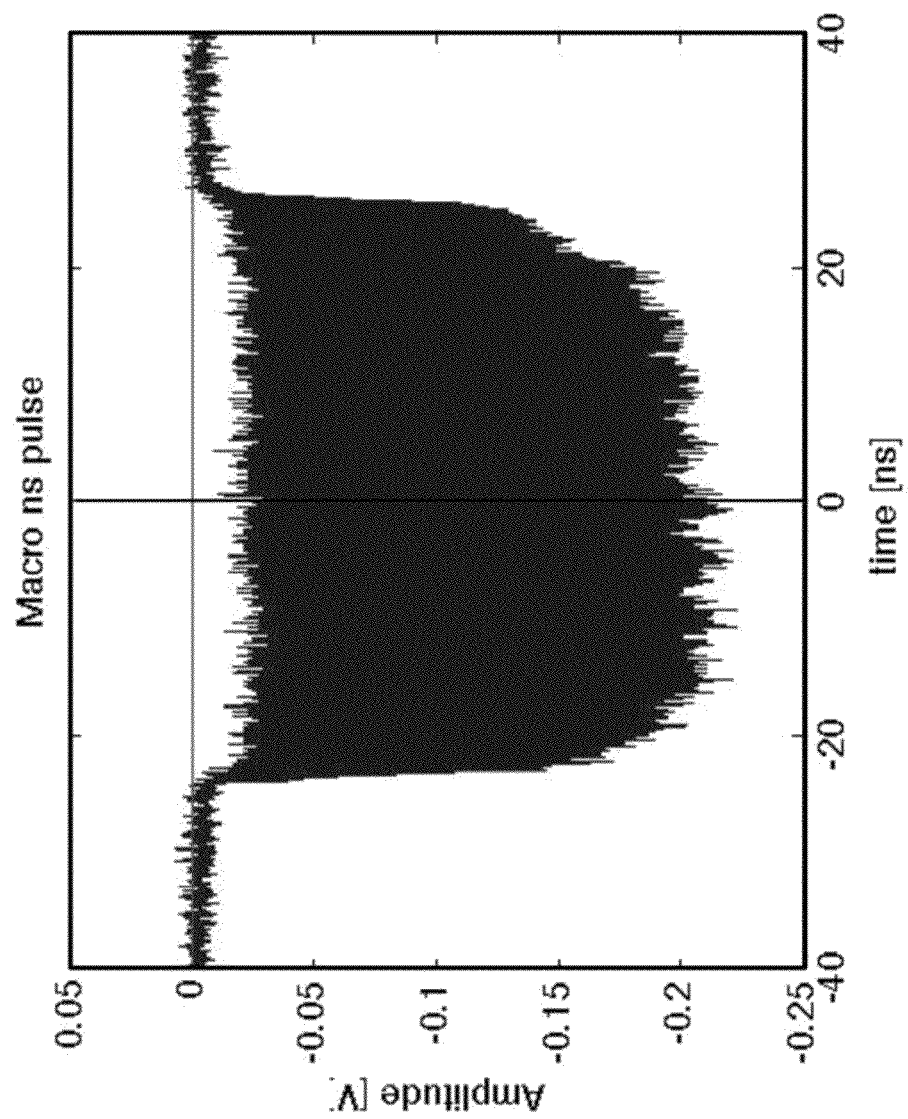
FIG. 3 shows a measured temporal trace of a laser macro-pulse recorded using a 12 GHz photodiode.

FIG. 3 shows the output signal of a high-speed photo-detector, depicting one such 50 ns macro-pulse; the individual 44 ps micro-pulses are barely resolvable on this time scale. Four 6 μm core Yb-doped fiber preamplifiers then amplify the resulting pulse train. Between each of the preamplifiers is a Crystal Technology acousto-optic modulator (AOM). The first of these AOMs operates at 500 kHz while remaining two AOMs further divide the macro-pulse train down to 250 kHz and 83.3 kHz, respectively, while simultaneously removing any inter-pulse amplified spontaneous emission.

The resultant output of the preamplifier chain is an 83.3 kHz, 20 mW macro-pulse train, which is then launched into a large-mode-area photonic crystal fiber amplifier (Crystal Fibre PZ-40 with a 29 μm mode field diameter), which boosts the power to 270 mW. The pulse train then passes through an optical isolator and is launched into 300 m of 6 μm polarization maintaining fiber, in which SPM induces a chirped, spectrally broadened high-bandwidth output signal. Only 75 mW of light is coupled into the SPM fiber.

This pulse train is then passed through a grating pair compressor using multi-layer dielectric gratings with a groove density of 1740 lines/mm. The angle of incidence is 61.8° and the grating slant distance is 260 mm, which was optimized to provide the narrowest autocorrelation signature. The output can then be measured with an optical spectrum analyzer, a high-speed digital scope using a 12 GHz photodiode, or a home-built autocorrelator. This output beam corresponds to beam 180 in FIG. 1.

Figure 4:
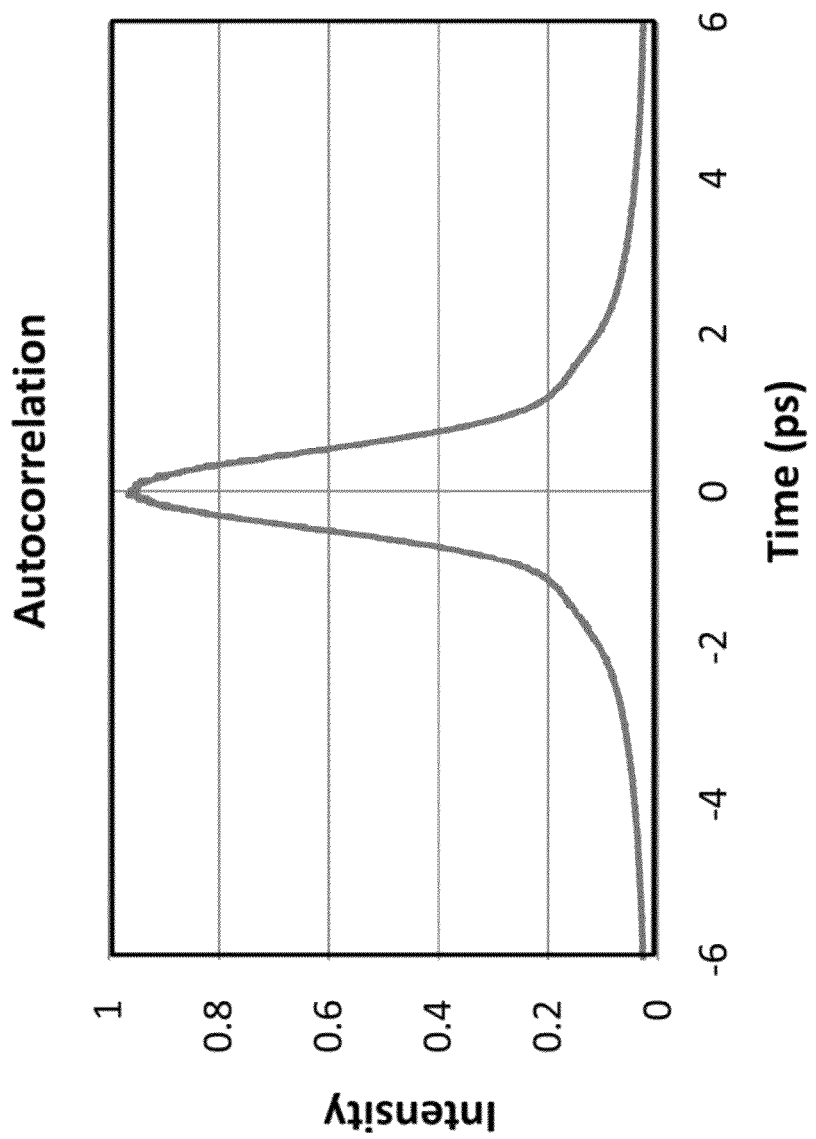
FIG. 4 shows a measured autocorrelation of the experimental and retrieved data of the compressed 11.4 GHz pulse train after 300 m of SPM fiber.

FIG. 4 shows the measured autocorrelation signal after the compressor, which has a full-width, half-maximum (FWHM) of 1.1 ps. This corresponds to a pulse width of ~850 fs.

Figure 5:
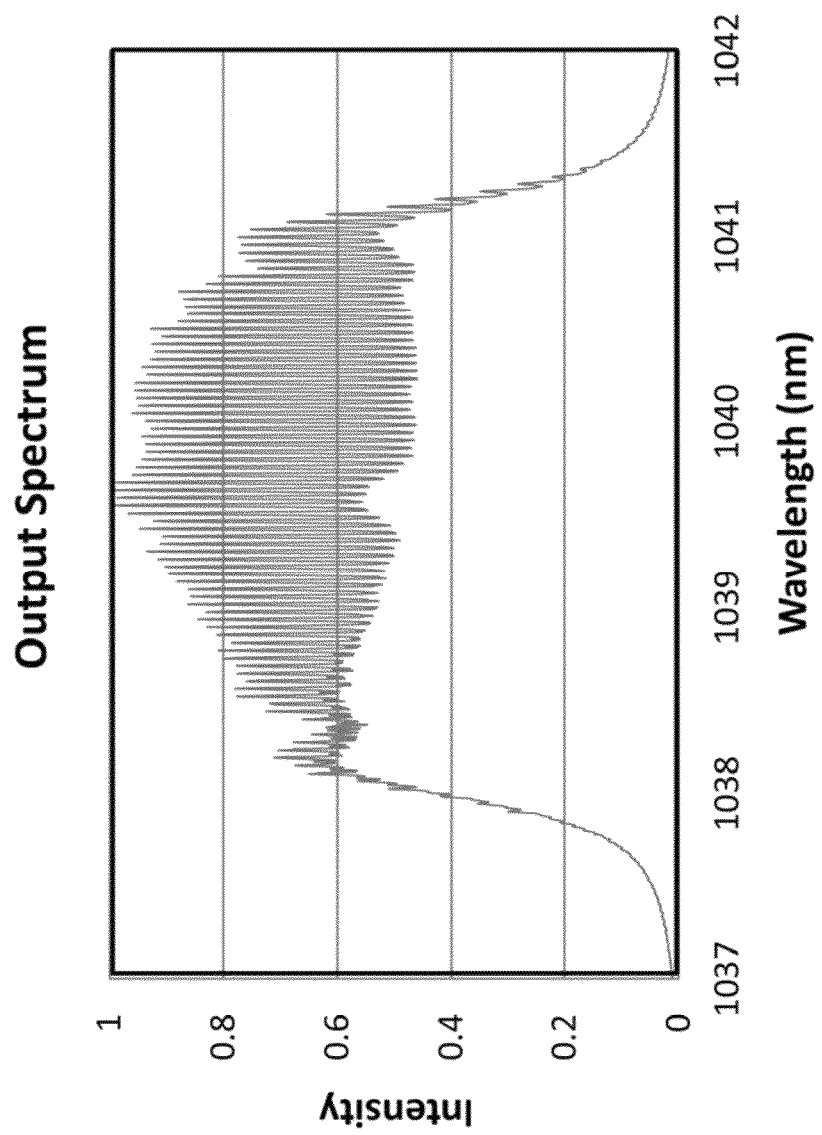
FIG. 5 shows a measured spectrum for a 1.6 nJ micro-pulse after propagating through 300 m of SPM fiber.

FIG. 5 shows the measured spectrum for our experimental setup at the output end of the 300 m fiber. For a 75 mW average power beam with an 83 kHz repetition rate, the energy per macro-pulse is 0.9 pJ, which corresponds to a micro-pulse energy of 1.6 nJ. The pulse shape corresponding to an RF drive voltage of 1.0 $V_\pi$ is used as an input. The high-frequency oscillations on the measured spectrum correspond to the 11.4 GHz repetition rate of the measured micro-pulse train.

To summarize, we have demonstrated the generation of 3.2 nm of compressible bandwidth and produced a micro-pulse train of 1.6 nJ pulses with 11.4 GHz spacing in bursts of 575 pulses each. In the embodiment shown in FIG. 1, the pulse train in this demonstration corresponds to the output beam 180 of the spectral-broadener/pre-compressor 120. Having demonstrated the viability of using RF to generate a synchronized laser pulse train as well as the ability of SPM to generate bandwidth, we can now add further amplification stages to the system to increase the pulse energy as well as enable further bandwidth generation, as depicted by modules 130 and 140, respectively, as shown in FIG. 1.

Figure 6:
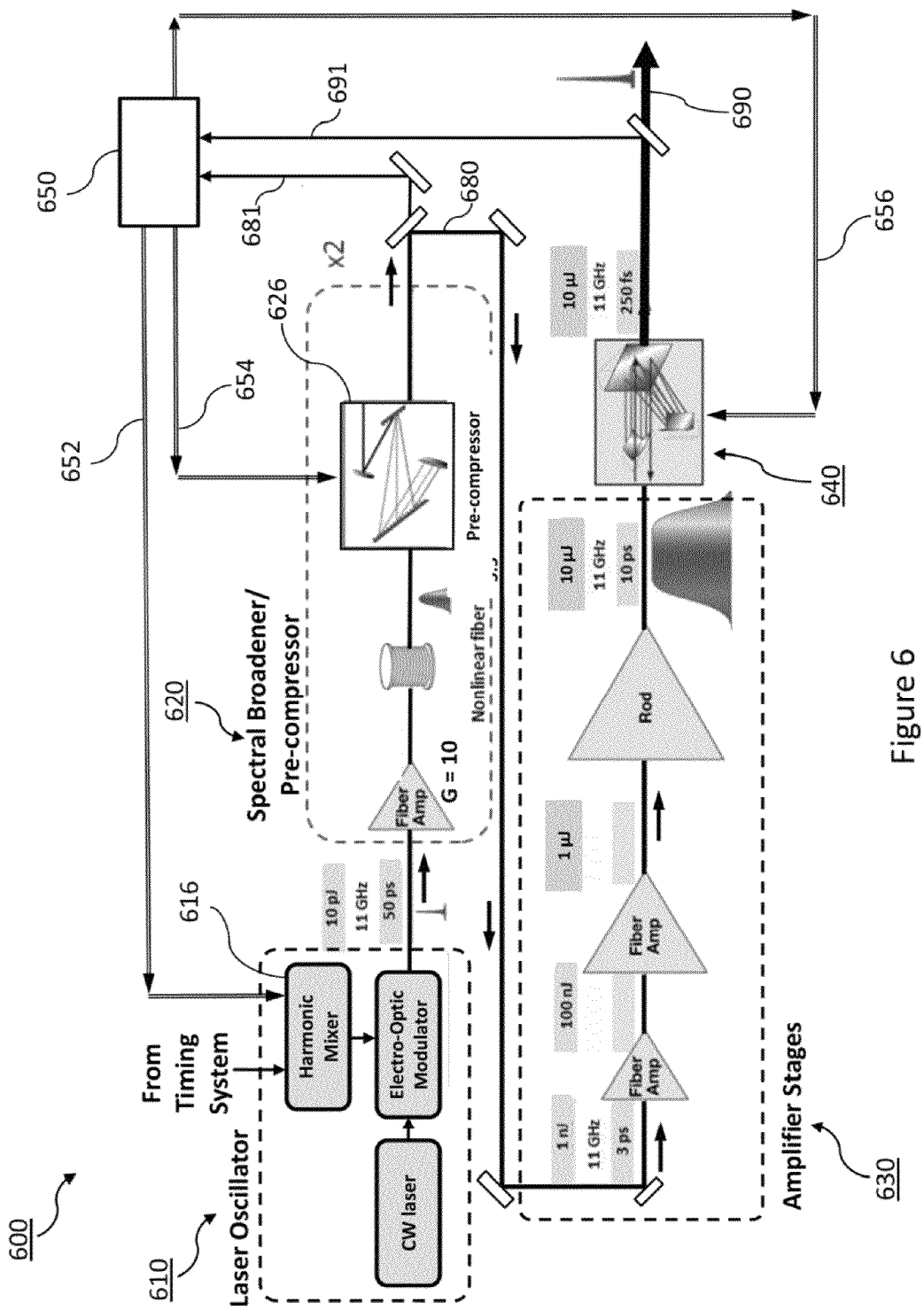
FIG. 6 depicts a system configuration of FIG. 1, augmented with servo-control of multiple pulse-shaping networks.

Turning now to FIG. 6, a system augmentation 600 is shown that provides control-loop feedback techniques for precision control, programmability, stability and mainte-nance of the desired output pulse shape and repetition rate of the basic system. By example, enhancements to the embodiment of FIG. 1 are described, with the proviso that such augmentations can be applied to all system embodiments discussed herein, including those depicted in FIG. 7 and FIG. 8.

Returning to FIG. 6, the basic system is comprised of a laser oscillator 610, a cascaded pair of spectral-broadener/pre-compressors 620, an amplification chain 630 and a final pulse-forming network 640. The system is also comprised of a feedback servo-controller 650, whose optical inputs are comprised of sampled beams, derived from the outputs of each system module. Based on these optical input samples and the servo algorithms employed, the servo-system provides feedback signals to optimize the performance of the harmonic mixer, as well as the micro-pulse-compressor networks in each stage of the system, resulting in an optimized micro-pulse output beam 690.

In this embodiment, samples of the pulsed optical output beams at various stages of the system, 681 and 691, respectively, as derived from the output of the initial stage of the system (module 620) and output of the combined amplifier and final compression stages (cascaded modules 630 and 640, respectively) provide input information to an in-line feedback control processor 650, which provides real-time feedback control to each pulse-forming network. Not shown is yet another candidate servo-controller optical input signal to processor 650, which can be derived by sampling the pulsed beam output as it exits the laser oscillator 610, and prior to impinging the spectral-broadener/pre-compressor module 620.

Respective feedback control is provided by the in-line processor 650 via servo control signal 652 to the harmonic mixer 616, via control signal 654 to the pre-compressor 626, and via control signal 656 to the final system pulse compressor 640.

Precision control of the harmonic mixer 616, with a goal to provide and maintain optimized parabolic micro-pulse profiles, is realized by servo-controlling the amplitude and phase of the fundamental frequency as well as each harmonic frequency component that drives the E-O modulator of the laser oscillator module 610.

In addition, precision control of the pulse compressors 626 and 640 with a goal to maintain the optimal pulse profile in each respective pulse-forming network, is achieved by employing a pair of programmable phase and/or amplitude spatial light modulators SLMs (not shown), each placed at the respective spectral transform plane of each respective pulse-forming network. The ability of SLMs to fine-tune the performance of optical pulse-compressors is well known in the art.

The specific feedback algorithm inherent in the in-line processor 650 can be selected based on the specific system design rules end-user needs, and includes such computational algorithms as genetic encoding, real-time correlation techniques and hill-climbing servo approaches, among others.

Figure 7:
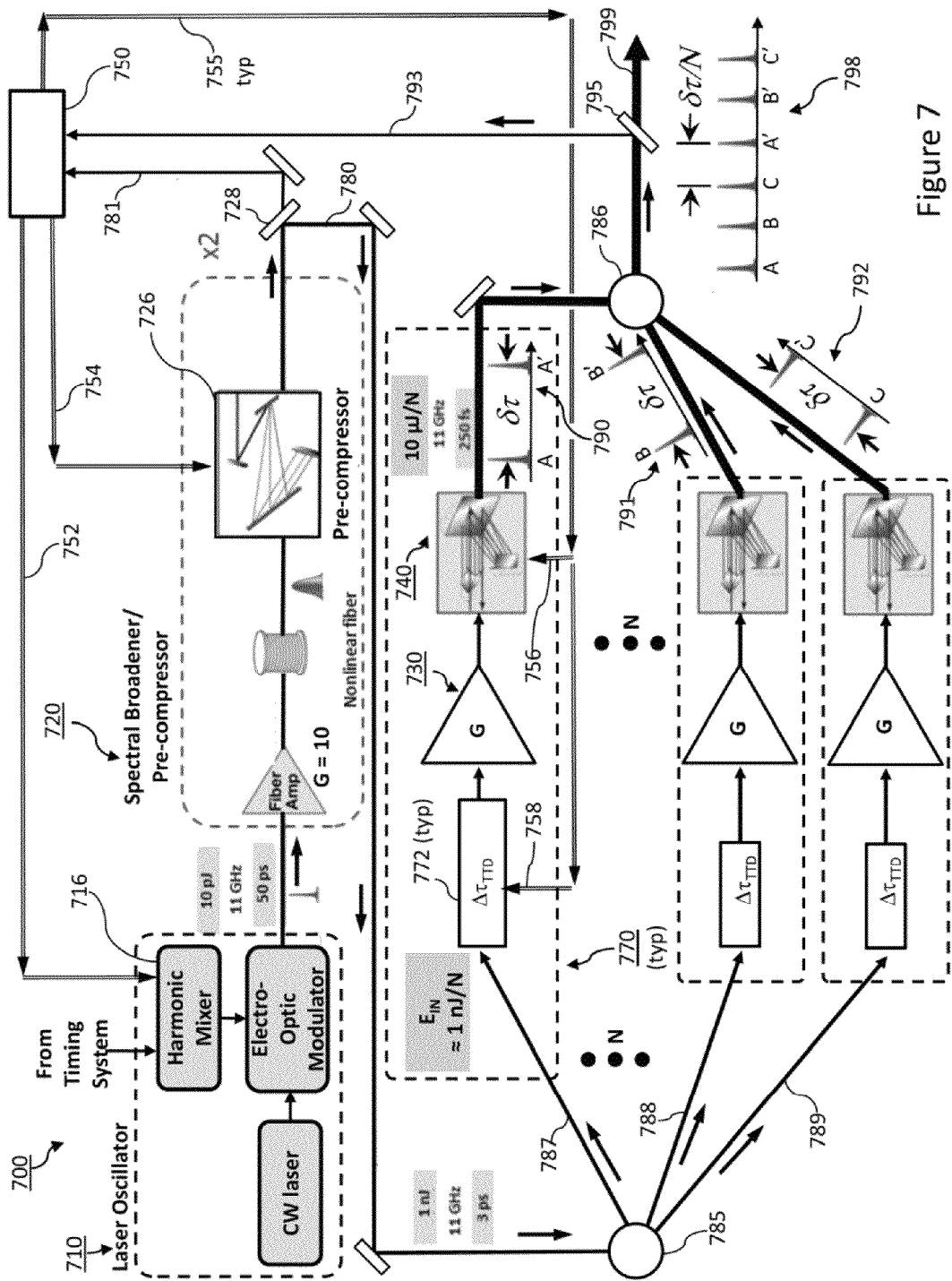
FIG. 7 depicts a system configuration of FIG. 1, augmented with servo-control of the pulse-shaping network (as in FIG. 6), as well as additional servo-control capability to realize a frequency-scaled, composite output pulse train from an array of parallel power-amplifier/pulse-compression modules.

Turning now to FIG. 7, another system augmentation 700 is shown to provide for dynamic skip-frequency combining of parallel amplification/pulse-forming modules 770 to achieve a higher frequency than the baseline frequency, where N pulse trains would be interweaved at specific spacings to form a combined, composite micro-pulse output train 799, at N times the baseline micro-pulse frequency.

Although not required, in the embodiment depicted in FIG. 7, the system is further augmented by an optional, servo-controlled, pulse-profile optimization system, as shown in FIG. 6, to provide more stable pulse generation and profile maintenance, which may become critical as the effective baseline frequency increases. Recall, in this case, samples of the micro pulses from the output of each system module (710, 720, and 770) provide pulse shape information to feedback processor 750, which can be employed to optimize the pulse profile of the micro-pulse output. This system augmentation is discussed in detail above with respect to FIG. 6.

Returning to FIG. 7, the frontend of the system is comprised of a laser oscillator no and a cascaded pair of spectral-broadener/pre-compressors 720 as before. The output beam 780 of the frontend is partitioned, via a 1-to-N splitter 785, into a set of N identical beamlets, 787, 788 and 789. Each respective beamlet, derived from the set of N identical beamlets, is incident upon a respective amplification/pulse-network module 770 (to be described below), with the ensemble of N identical such modules 770 arranged in a parallel configuration. The set of N parallel beamlets 790, 791 and 792, which exit the corresponding set of N modules 770 are recombined via an N-to-1 splitter 786 (in a reciprocal manner relative to splitter 785), resulting in a composite output beam 799. As is discussed below, using this interleaving technique, the effective micro-pulse composite frequency of the output beam 799 is N times that of the laser oscillator micro-pulse frequency.

In this embodiment, samples of the optical, micro-pulse train outputs from the N respective modules 770 provide information to a servo controller 750. The servo-controller generates feedback signals 758 that optimize a set of true-time delay network devices 772 to assure that the pulse interleaving from the modules results in a composite pulse train output 799 with equal temporal spacings between all micro-pulses in the sequence.

Returning to FIG. 7, we assume that the micro-pulse period at the output of the laser oscillator 710 is given by $\delta\tau$, which corresponds to an RF baseline frequency given by $f=1/\delta\tau$. In practice, this frequency may be limited by the modulator and/or the harmonic mixer. This follows, especially considering that, for parabolic pulse profiles, the frequency bandwidth of the mixer/modulator must accommodate 4th order harmonics, which may place constraints on the baseline frequency of the oscillator. Another limitation on the maximum frequency of the system may be due to limitations imposed by undesirable pulse-to-pulse overlap, which can result from self-phase-modulation (SPM) induced pulse bandwidth broadening. In this case, an upper limit on the frequency is imposed to prevent such pulse overlap.

In either case, by designing a system to function at a frequency below these limits, and, by subsequently performing a pulse interleaving (interweaving) function beyond the final output stage, one can realize a desired high frequency micro-pulse stream, while operating below critical frequency limits.

Referring to FIG. 7, we assume that the goal of this system is to generate a composite micro-pulse output sequence, with a period of $\delta\theta/N$. In this case, the resultant output frequency will be equal to N times f. We assume that the amplified and pulse-narrowed wave-train output of module, 720 (comprised of an 11 GHz sequence of 1 nJ micro-pulses bunched in macro-pulse bursts, each micro-pulse of 3 ps in duration), is equally partitioned into N identical beamlets, via a 1-to-N fiber coupler 785, as an example, with each beamlet (787, 788 and 789) directed to a respective amplifier/pulse-compressor module 770 arranged in the form of an ensemble of N parallel, typically identical, modules 770. Hence, the incident energy per pulse incident upon each module will be the same, in this case, 1 nJ/N. Each parallel module 770 is comprised of a respective amplifier chain 730 each with a net gain of $10^4$, in series with a respective pulse compressor 740 (similar to the respective modules 130 and 140 in FIG. 1). In addition, each module 770 is comprised of a respective, upstream programmable true-time-delay ($\Delta\tau_{TTD}$) network 772.

In this example, each module 770 provides an output stream of f=11 GHz pulses, with each output micro-pulse of energy 10 µJ/N and with a micro-pulse duration of 250 fs. The period of each respective pulse train is the same, $\delta\tau$, as shown by the wave trains 790, 791 and 792. These identical wave trains (at frequency, f), are recombined by the N-to-1 splitter 786, resulting in a composite output beam 799, with a composite waveform 798.

To assure that the pulse trains are properly sequenced and interleaved, optical output samples 793 from each module 770 are directed to the feedback processor 750. Processor 750, in turn, provides control signals to the respective true-time-delay modules 772 via feedback signals 758 to assure and maintain temporal spacing and pulse-to-pulse interleaving of the N module outputs. The servo-controller also compensates for relative jitter amongst the ensemble of modules 770. It is to be noted that jitter arising from the master clock, which synchronizes the laser oscillator no to the system is of no consequence insofar as the interleaving system described herein. This follows, since any absolute jitter of the baseline RF drive frequency will be common to all N modules 770 and, therefore not affect the relative true-time delay parameters.

The result, in this example, is a composite pulse sequence of period $\delta\tau/N$, which corresponds to a composite output micro-pulse frequency of N times f. In this example, each micro-pulse will retain a duration of 250 fs, but, now at a baseline frequency of 44 GHz and with a micro-pulse energy of 10 µJ/N. Hence, the total energy over a time interval, $\delta\tau$, consistent with the initial baseline RF frequency (11 GHz in this example), will remain at 10 pJ, which corresponds to a sequence of N micro-pulses.

As noted above, the overall system 700 in this embodiment also includes an optional pulse waveform control system, as shown in FIG. 6. In this manner, a common system feedback controller 750 drives the respective SLM in each pulse compressor 740 via feedback control link 756 of the N-modular parallel system. The same controller also maintains the desired waveform, as generated by the pre-compressor 726 (via control link 754), and the harmonic mixer 716 (via control link 752). The controller 750 also controls and maintains (via control link 758) the proper true-time delay of each respective leg of the system to assure frequency combining of all the modules that comprise the overall system, resulting in a high-frequency composite output pulse train.

The aggregate energy in a burst of micro-pulses that comprise one or more macro-pulses can be harnessed with an etalon—a pair of mirrors separated by air or other transparent material. One can classify this embodiment as coherently combining pulses in a temporal sense, also referred to as external cavity enhancement or coherent pulse stacking. In this case, a single micro-pulse (or, super-pulse) will form within the etalon, with an energy equal to the total energy of the micro-pulses within a given macro-pulse. This condition goes beyond that of a conventional Fabry-Perot resonator, in which case, a stable mode can be formed within the cavity, with an amplitude enhanced by the cavity Q. In this case, the incident pulse train is not only in resonance with the cavity in the conventional sense, but, moreover, is synchronous with all the micro-pulses in the pulse sequence. That is, the cavity mode spacing (in the frequency domain) is related to the micro-pulse repetition rate by an integer. This condition is not unlike that of a mode-locked laser, in which case the mode-locked stream of output pulses from this class of laser has a temporal spacing equal to the round-trip cavity time.

Figure 8:
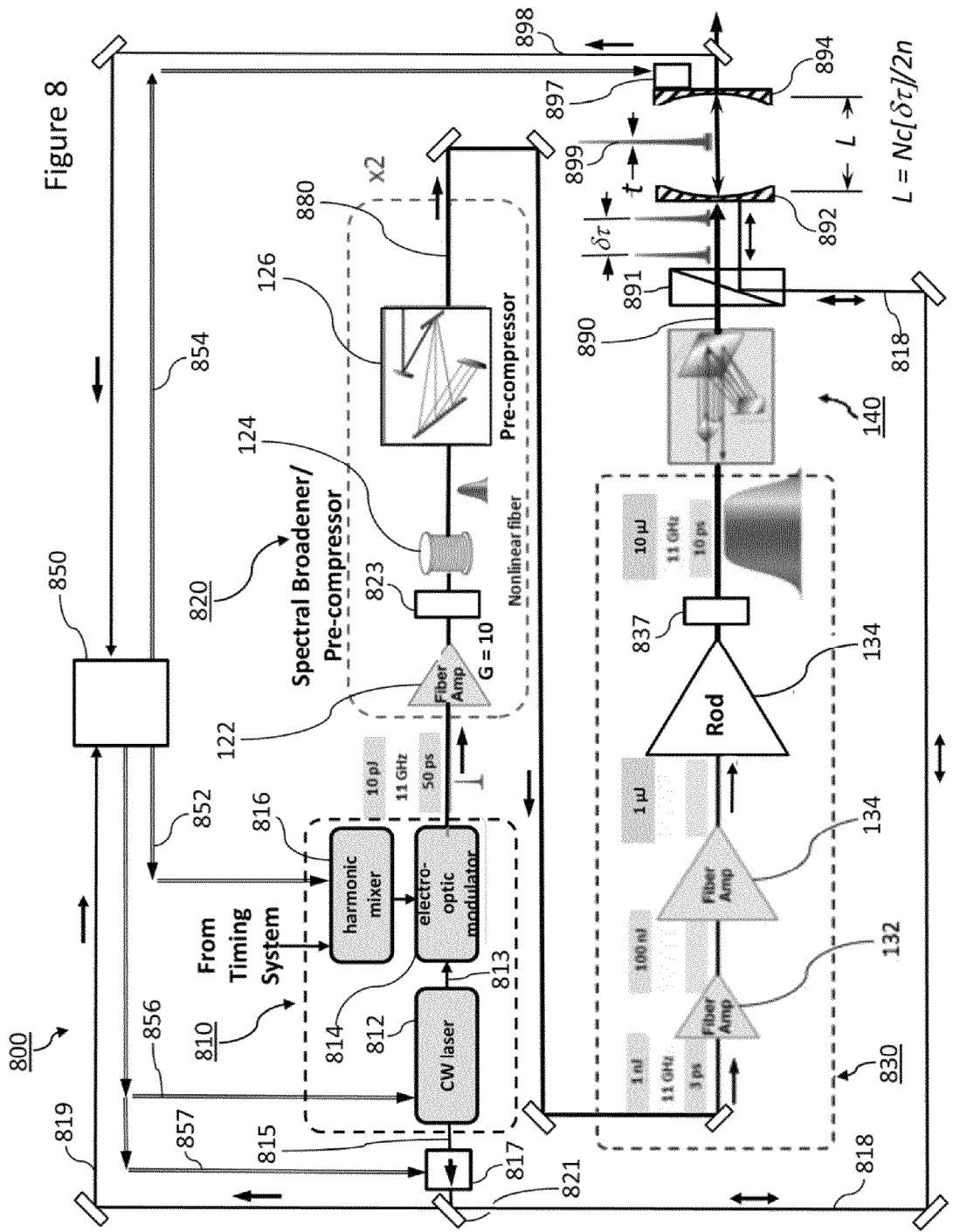
FIG. 8 depicts a system configuration of FIG. 1, augmented with a resonant etalon.

Turning now to FIG. 8, an embodiment is shown that augments the basic system depicted earlier in FIG. 1 (as well as FIG. 6), now, with a resonant etalon at its output. The basic system output 890 (recall 190 in FIG. 1) is comprised of a sequence of micro-pulses, whose pulse-to-pulse period is given by $\delta\tau$, as shown in FIG. 8. The output beam 890 is incident upon the etalon, which is comprised of mirrors 892 and 894, thereby forming an optical cavity, in which micropulse 899 forms an intra-cavity beam, of temporal duration, t.

As is well known in the art, a fundamental condition for a cavity mode to exist within an Fabry-Perot resonator, is that the separation, $L_{F-P}$, between the mirrors must be adjusted to be an integral multiple of half-wavelengths of the incident light, that is $L_{F-P}=R\lambda/2n$, where R is an integer, $\lambda$ is the nominal wavelength of the light, and n is the refractive index. Under this condition, the light within the cavity will constructively interfere resulting in a stable set of cavity modes. Note that the Fabry-Perot condition can be also written as $L_{F-P}=Rc\Delta T/2n$, where $\Delta\tau$ is the optical period of the light.

In addition, for an aggregate pulse (a super pulse) to form within the etalon, the separation between the etalon mirrors, L, must be adjusted so that the round-trip transit time of pulse 899 within the etalon—the time required to travel from the first mirror 892 to the second mirror 894 and back to the first—is roughly an integer multiple of the temporal micropulse spacing, $\delta\tau$. This condition is satisfied when $L=Nc[\delta\tau]/2n$, where N is an integer, c is the speed of light in vacuum, and n is the refractive index through which the pulse 899 propagates within the cavity.

If both of these conditions are satisfied, the etalon is considered temporally resonant with the pulse stream. This set of conditions is equivalent to setting $L_{F-P}=L$, which implies that $\delta\tau=K\Delta\tau$, where K is an integer. Essentially, the temporal resonant condition requires that the temporal spacing between micro-pulses be an integral number of optical periods.

Another design rule is that the resonant etalon to preserve the short-pulse duration (i.e., without pulse spreading), This implies that the resonator Q must be designed to accommodate the spectral bandwidth of the pulses, which places an upper limit on this parameter, so that the pulse width retains is short value, t.

Turning again to FIG. 8, the basic resonant etalon system is comprised of a laser oscillator module 810; a spectral-broadener/pre-compressor module 820 with an optical limiter; an amplifier chain module 830 also with an optical limiter; a pulse compressor network 140; the resonant etalon, comprised of mirrors 892 and 894; and a servo-controller module 850.

As discussed above (recall FIG. 1), the laser oscillator 810 provides a stream of micro-pulses at a repetition rate in the range of 11 GHz, with each micro-pulse of energy 10 pJ, and of duration of 50 ps. The output beam 813 of a cw laser 812 is modulated by EOM 814, driven by harmonic mixer 816 to generate the desired micro-pulse wave train. Note that, as before, the micro-pulses can be gated to form a sequence of macro-pulses with a repetition rate in the range of 100 kHz, and, with each macro-pulse comprised of a number of micropulses, in the range of 500 micro-pulses per macro-pulse.

The micro-pulse train is incident upon a pair of cascaded spectral-broadener/pre-compressor modules 820 similar to the module 120 of FIG. 1, now with an optical limiter 823 located between the fiber amplifier 122 and the nonlinear fiber SPM 124. The function of the optical limiter is to limit the intensity of the ensemble of micro-pulses to a set value so that the pulse train is more uniform in intensity. In this manner, the nonlinear phase shift acquired upon propagation for the micro-pulses through the SPM fiber will be similar for all pulses. Under this condition, the pre-compressor will result in an ensemble of output pulses 880 that is more uniform in pulse duration, owing to the present of the optical limiter 823. Optical limiters are well known in the art, examples of which are bistable nonlinear optical devices, reverse saturable absorbers, among other elements.

With a given macro-pulse, one expects that the relative phase of one micro-pulse, in relation to the other micro-pulses in the macro-pulse, should be maintained, as they are all derived from a stable laser modulator/harmonic mixer. A potential loss of coherence can occur if the amplitudes of the micro-pulses are not similar, owing to the SPM fiber. Several techniques can be implemented to assure uniform amplitudes amongst the ensemble of micro-pulses within a given macropulse. One technique is to operate the amplifier chain far above its gain saturation parameter, thereby assuring that all micro-pulses are in the saturation regime (resulting in similar amplitudes of the ensemble). Another technique is to employ an optical limiter downstream of the amplifier chain and prior to the optical fiber spectral bandwidth expander (broadener).

In the event that the temporal dynamics of the amplifiers and/or the optical limiter place limits on the time necessary for steady-state conditions to occur during the period between micro-pulses, one can increase the period via the pulse-interweaving embodiment, as described above. In this case, a minimum period between micro-pulses is established by operating the baseline RF generator at the frequency sufficient low to assure steady-state gain saturation and optical limiter performance. Then, a set of N parallel interweaving amplifier chains are employed, so that the product of N times the reduced baseline frequency is equal to the final, desired effective baseline frequency.

In this manner, each amplifier chain will see a micro-pulse period of a temporal length sufficiently long to assure steady-state operation of the given amplifier gain medium and optical limiter, yet, collectively, be combined via the interleaving embodiment to result in the desired baseline RF clock frequency.

Returning now to FIG. 8, the pulse train 880, typically comprises an 11 GHz sequence of micro-pulses bunched in macro-pulse bursts, with each pulse of energy 1 nJ and 3 ps in duration. This pulse train is then incident upon the amplifier chain module 830. This module is similar to the module 130 of FIG. 1, now with an optical limiter 837 located following the power amplifier rod 134. As is the case of the optical limiter 823, the present limiter provides a similar function, albeit designed to operate with pulses of a higher pulse energy and with a shorter temporal duration. The output of module 830 is typically comprised of a micro-pulse train at 11 GHz, with an energy per micro-pulse of 10 µJ and with a micro-pulse duration of 10 ps. This pulse train is then directed to a final pulse compressor 140, resulting in an output pulse stream 890 at 11 GHz, with an energy per micro-pulse of 10 µJ and with a micro-pulse duration of 250 fs.

This micro-pulse stream (assumed to be p-polarized) then passes through a polarizing beam splitter 891, an example of which is a Glan prism, and is subsequently incident upon the resonant etalon, comprised of mirrors 892 and 894.

Two different servo-control loops are used to control the laser wavelength and the longitudinal spacing of the etalon to assure stable mode operation as well as resonant pulse stacking within the etalon. In the former case, the laser wavelength is controlled by directing a cw beam 815 from laser 812 through an optical isolator/modulator 817, resulting in a modulated probe beam 818. This probe beam (assumed to be s-polarized) is reflected by beam splitter 821, and is incident upon Glan prism 891. The probe beam 818 is reflected by the Glan prism 891 and directed to impinge upon the input port of the etalon (for ease of viewing, beams 818 and 890 are displaced from each other, but, in reality, overlap and co-propagate toward the etalon). The probe beam 818, which forms the error signal to drive the servo-controller 850, is then retro-reflected from the input port of the etalon, then re-directed back through the same optical path, reflecting from the Glan prism, passing through beam splitter 821, and emerging as beam 819, which is the detected by the servo-controller 850. The servo-controller provides feedback to fine-tune the laser frequency via signal 856 to assure etalon cavity mode stability. Specifically, a lock-in amplifier within controller 850 provides a reference modulation signal 857 to the modulator/isolator 817.

The detected probe beam error signal 819 is then minimized by the servo-controller, thereby assuring etalon mode stability (i.e., an integral number of half-wavelengths within the optical cavity). The use of an optical isolator 817, in conjunction with orthogonal polarizations for the probe beam (818) and the system output beam (890) inhibits the occurrence of laser instability via undesirable optical feedback of stray and/or scattered light into the laser 812 by either of these two beams. Another source of potential noise, detection of the system pulsed output by the servo-controller (850) sensors, can be minimized by gating the probe laser beam, so that it is present only during the macro-pulse dead times. Finally, the phase-sensitive lock-in detection system within the controller (850) effectively filters out the system output via phase-locking onto the reference frequency that drives the probe-beam modulator 817.

A second servo-feedback system controls the resonant etalon to assure that the period ($\delta\tau$r) of the micro-pulse train and the cavity round-trip time (T=2nL/c) are related by an integer (as discussed above). This requirement can be realized by either adjusting the physical length of the etalon, L (thereby tuning the round trip time), and/or by adjusting the RF baseline frequency ($1/\delta\tau$) that drives the harmonic mixer (thereby tuning the micro-pulse repetition rate). In either case, an etalon error signal 898, derived by beam-splitting a small fraction of the system output pulse train, is detected by the servo-controller 850. The servo-controller then maximizes the amplitude of this error signal (implying optimization of the aggregate pulse) by either providing a feedback control signal 854 to (coarsely, relative to an optical wavelength) adjust the cavity length, L, via transducer 897, or by providing a feedback control signal 852 to adjust the fundamental RF mixer 816 drive frequency ($1/\delta\tau$).

Note that an aggregate pulse can be realized, subject to pulse-to-pulse (temporal) coherence under two system modalities. In the case discussed above, it is implied that the aggregate pulse is limited to the ensemble of micro-pulses within a single macro-pulse (comprised of approximately 500 micro-pulses). Thus, each macro-pulse is independent relative any other macro-pulse insofar as the formation of an aggregate (or, super) pulse is concerned.

In this case, it is assumed that there exists temporal coherence amongst the ensemble of micro-pulses, which is typically the case, assuming that each micro-pulse in the sequence has a well-defined phase relationship with respect to all other pulses (or, at least, a majority of pulses). Recall, that the use of an optical limiter in the pulse-forming network provides a means by which the coherence can be preserved, at least in terms of the SPM operation.

Another system modality applies in the case whereby a more "global" aggregate pulse is desired, which includes temporal coherence amongst several macro-pulses. In this case, coherence must be assured not only amongst micro-pulses within a given macro-pulse is required, but, in addition, coherence must be assured amongst micro-pulses across different macro-pulses. To realize this enhanced temporal coherence, the choice of RF drive frequency must be set so that the micro-pulses within one macro-pulse have the same phase relationship to those micro-pulses within a different macro-pulse.

This more stringent condition (in addition to the other conditions that apply in the case of a single macro-pulse) can be realized using the system in FIG. 8. In this case, the period between macro-pulses ($\Delta T$) must be related to the optical period ($\Delta\tau$) by an integer (in addition to the coherence within a single macro-pulse). One approach to ensure this condition is to impose two different reference modulation signals (as provided by the servo-controller 850 via signal 857) onto the isolator/modulator 817. One reference modulation signal is used, as before, to adjust the wavelength of the laser light that enters the etalon to assure cavity stability. Recall, in this case, the error signal is derived from the reflected probe beam 818 from the input port of the etalon. The second reference modulation signal (also imposed by controller 850 via signal 857) is also applied to the cw laser isolator/modulator 817, but, in the case, the error signal is derived from the etalon output via sampled signal 898, as input the controller 850. By phase-locking onto this pair of (unrelated) error signals, the laser frequency can be fine-tuned to assure macro-pulse-to-macro-pulse temporal coherence, thereby resulting in an aggregate pulse with an energy equal to that of several macro-pulses, as well as cavity stability within the etalon. This enhanced modality assumes that the etalon cavity lifetime exceeds the macro-pulse period to enable the aggregate pulse to form within the etalon over many macro-pulses.

Those skilled in the art realize that the pulses overlap and reinforce in a resonant etalon, and that the optical field strength inside etalon can, in principle, reach a level that would be produced by a single pulse that contains the aggregate energy of the micro-pulses that comprise the macro-pulse. The etalon technique offers the great advantage though, that the micro-pulse energy can remain safely below the damage threshold of the optical fiber that carries them, while the combined energy of the micro-pulses can be very high-sufficiently high to trigger desirable nonlinear phenomena, to interact in a useful manner with a second probing laser or particle beam, or if switched from the cavity, to interact with another material or target.

We discuss here three potential approaches to circumvent, or, at least greatly suppress the deleterious conversion of light to longer wavelengths by nonlinear Raman scattering processes.

It is well known that, in the presence of unwanted Stimulated Raman Scattering in fiber amplifiers, the performance of short-pulse power amplifiers can be degraded due to the undesirable conversion of light to longer wavelengths. In this invention, Raman scattering tends to inhibit the desired broadening of the pulse spectrum and the concomitant shortening of the compressed pulse's temporal width. A potential approach to minimize, if not eliminate the possibility of such SRS parasitics in guided-wave structures is to effectively increase the SRS threshold so that the onset of the stimulated scattering oscillation process is never obtained under normal system conditions.

One method to raise the Raman threshold is by choosing an optical fiber that has simultaneously low losses at some desired wavelength and high losses at the slightly longer wavelengths at which the Raman process tends to convert the desired light. Such fibers are well known; see, for example: J.

Kim, P. Dupriez, C. Codemard, J. Nilsson, and J. Sahu, "Suppression of stimulated Raman scattering in a high power Yb-doped fiber amplifier using a W-type core with fundamental mode cut-off," Opt. Express 14, 5103-5113 (2006).

A second method to accomplish this is to provide a means by which spontaneously scattered Raman photons (i.e., Stoke's shifted photons) are effectively removed from the structure. In this manner, the build-up to SRS oscillation is greatly suppressed, so long as the Stoke's shifted photon loss coefficient exceeds that of the effective Raman gain. This condition can be realized by designing a guided-wave structure with a distributed out-coupler at the Stoke's shifted wavelength. In the case of a conventional (TIR) fiber amplifier or waveguide amplifier, the out-coupler can be in the form of a narrowband distributed grating along the length of the structure. On the other hand, in the case of a photonic crystal fiber amplifier, the effective Bragg-induced guided-wave structure can be designed to possess a forbidden bandgap at the Stoke's shifted wavelength. In the latter case, the effective Bragg condition will not be satisfied at the Stoke's shifted wavelength. Hence, the spontaneous Raman shifted photons will not experience Bragg-induced guiding along the length of the structure.

One can view these (selective wavelength loss) approaches in the context of a multi-channel guided-wave communication link, with an add/drop filter (e.g., a wavelength demultiplexer) at the Stoke's shifted wavelength. In either case, for a sufficient out-coupling Stoke's shifted coefficient, the SRS oscillation condition can be designed to never be satisfied for the given fiber parameters (length, intensity, etc.).

In a third approach, the optical amplifier(s) can be designed to be in the form of broadband Raman fiber amplifiers, typical of those employed in telecommunication applications. In this approach, a pump laser wavelength is chosen so that the optical wavelength of the pulse train in the above system embodiments corresponds to the Stoke's shifted wavelength of the structure, given the material properties of the fiber amplifier. Hence, the sequence of 100 fs micro-pulses of beam 880 in FIG. 8, will serve as an effective Stoke's shifted seed beam, which will experience distributed Raman gain as it propagates through the optically pumped Raman fiber amplifier. Therefore, as opposed to the former approach (wherein the Raman gain induces parasitics), the present exploits the Raman gain to advantage, as a mechanism to amplify the desired pulse train.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising:
a continuous wave (CW) laser for providing a CW laser beam;
at least one electro-optic modulator for modulating said CW beam to produce a high repetition rate seed beam;
an optical amplifier capable of amplifying said seed beam to produce an amplified seed beam;
a spectral broadener for broadening the optical spectrum of said amplified seed beam to produce a spectrally broadened beam; and
a pre-compressor for temporally compressing said spectrally broadened beam to produce a train of bandwidth-limited short-duration output pulses.

2. The apparatus of claim 1, further comprising:
at least one amplifier stage configured to amplify the power of said output pulses to produce amplified pulses; and
a pulse compressor configured to compress said amplified pulses to produce a train of short-pulse, high repetition-rate, high energy output pulses.

3. An apparatus, comprising:
a continuous wave (CW) laser for providing a CW laser beam;
at least one electro-optic modulator for modulating said CW beam to produce a high repetition rate seed beam;
an optical amplifier capable of amplifying said seed beam to produce an amplified seed beam; and
means for using self phase modulation of said amplified seed beam to produce a train of bandwidth-limited short-duration output pulses from said amplified seed beam, wherein said means comprises at least one:
a spectral broadener for broadening the optical spectrum of said amplified seed beam to produce a spectrally broadened beam; and
a pre-compressor for temporally compressing said spectrally broadened beam to produce said train of bandwidth-limited short-duration output pulses.

4. An apparatus, comprising:
a continuous wave (CW) laser for providing a CW laser beam;
at least one electro-optic modulator for modulating said CW beam to produce a high repetition rate seed beam;
an optical amplifier capable of amplifying said seed beam to produce an amplified seed beam;
a first spectral broadener for broadening the optical spectrum of said amplified seed beam to produce a first spectrally broadened beam;
a first pre-compressor for temporally compressing said first broadened beam to produce a first temporally compressed beam;
a second spectral broadener for broadening the optical spectrum of said first temporally compressed beam to produce a second spectrally broadened beam; and
a second pre-compressor for temporally compressing said second broadened beam to produce said train of bandwidth-limited short-duration output pulses.

5. The apparatus of claim 1, wherein said at least one electro-optic modulator is configured for modulating said CW beam at a radio-frequency.

6. The apparatus of claim 1, wherein said at least one electro-optic modulator is driven by a parabolic drive signal.

7. The apparatus of claim 1, wherein said at least one electro-optic modulator comprises a first modulator and a second modulator, wherein said first modulator creates a very high frequency stream of micro-pulses from said CW beam, wherein said second modulator carves pulse bunches from said stream, and wherein said second modulator operates at a lower frequency than said first modulator and is gated for a predetermined interval of time to produce macro-pulses.

8. The apparatus of claim 6, wherein said first modulator is driven at a frequency >2 GHz and said second modulator is driven at a frequency >10 KHz, and wherein said second modulator is gated to allow >100 pulses per macro-pulse.

9. The apparatus of claim 1, wherein said optical amplifier comprises an optical fiber amplifier, wherein said spectral broadener comprises a nonlinear optical fiber and wherein said pre-compressor comprises a pair of dispersive elements.

10. The apparatus of claim 1, wherein said spectral broadener comprises a nonlinear optical fiber selected to preferentially attenuate light that would otherwise be generated by nonlinear stimulated Raman scattering.

11. The apparatus of claim 1, wherein said electro-optic modulator is driven by a parabolic drive signal selected from the group consisting of (i) periodic in time, (ii) aperiodic in time and (iii) arbitrary in time.

12. The apparatus of claim 9, wherein an optical limiter is positioned between said fiber amplifier and said pulse broadener, wherein said optical. limiter is configured to produce substantially uniform intensity pulses in a plurality of pulses of said amplified seed beam.

13. The apparatus of claim 1, wherein said CW laser is configured to provide at least one wavelength within a range within a range from 1000 nm to 2000 nm.

14. The apparatus of claim 1, wherein said at least one electro-optic modulator is configured to produce a high repetition rate seed beam having a repetition rate of at least 2 GHz.

15. The apparatus of claim 1, wherein said at least one electro-optic modulator is configured to produce a high repetition rate seed beam having a repetition rate within a range from 1 GHz to 100GHz.

16. The apparatus of claim 1, wherein said short-pulse, high repetition-rate, high energy output pulses comprise a pulse duration within a range from 10 fs to 1 ps, a repetition rate within a range from 1 GHz to 100 GHz and energy within a range from 100 pJ to 1 µJ.

17. The apparatus of claim 1, wherein said short-pulse, high repetition-rate, high energy output pulses comprise a pulse duration within a range from 10 fs to 1 ps, a repetition rate within a range from 1 GHz to 100 GHz and energy within a range from 1 µJ to 10 mJ.

18. A method, comprising:
providing a continuous wave (CW) laser beam from a CW laser;
modulating, with at least one electro-optic modulator, said CW beam to produce a high repetition rate seed beam;
amplifying, with an optical amplifier, said seed beam to produce an amplified seed beam;
broadening, with a spectral broadener, the optical spectrum of said amplified seed beam to produce a spectrally broadened beam; and
temporally compressing, with a pre-compressor, said spectrally broadened beam to produce a train of band width-limited short-duration output pulses.

19. The method of claim 18, further comprising:
amplifying, with at least one amplifier stage, the power of said output pulses to produce amplified pulses; and
compressing, with a pulse compressor, said amplified pulses to produce a train of short-pulse, high repetition-rate, high energy output pulses.

20. A method, comprising:
providing a continuous wave (CW) laser beam from a CW laser;
modulating, with at least one electro-optic modulator, said CW bean to produce a high repetition rate seed beam;
amplifying, with an optical amplifier, said seed beam to produce an amplified seed beam; and
utilizing means for using self phase modulation of said amplified seed beam to produce a train of bandwidth-limited short-duration output pulses from said amplified seed beam, wherein said means comprises at least one of:
a spectral broadener for broadening the optical spectrum of said amplified seed beam to produce a spectrally broadened beam; and
a pre-compressor for temporally compressing said spectrally broadened beam to produce said train of bandwidth-limited short-duration output pulses.

21. A method, comprising:
providing a continuous wave (CW) laser beam from a CW laser;
modulating, with at least one electro-optic modulator, said CW beam to produce a high repetition rate seed beam;
amplifying, with an optical amplifier, said seed beam to produce an amplified seed beam; and
utilizing means for using self phase modulation of said amplified seed beam to produce a train of bandwidth-limited short-duration output pulses from said amplified seed beam, wherein said means comprises:
a first spectral broadener for broadening the optical spectrum of said amplified seed beam to produce a first spectrally broadened beam;
a first pre-compressor for temporally compressing said first broadened beam to produce a first temporally compressed beam;
a second spectral broadener for broadening the optical spectrum of said first temporally compressed beam to produce a second spectrally broadened beam; and
a second pre-compressor for temporally compressing said second broadened beam to produce said train of bandwidth-limited short-duration output pulses.

22. The method of claim 18, wherein said at least one electro-optic modulator is configured for modulating said CW beam at a radio-frequency.

23. The method of claim 18, wherein said at least one electro-optic modulator is driven by a parabolic drive signal.

24. The method of claim 18, wherein said at least one electro-optic modulator comprises a first modulator and a second modulator, wherein said first modulator creates a very high frequency stream of micro-pulses from said CW beam, wherein said second modulator carves pulse bunches from said stream, and wherein said second modulator operates at a lower frequency than said first modulator and is gated for a predetermined interval of time to produce macro-pulses.

25. The method of claim 23, wherein said first modulator is driven at a frequency >2 GHz and said second modulator is driven at a frequency >10 KHz, and wherein said second modulator is gated to allow >100 pulses per macro-pulse.

26. The method of claim 18, wherein said optical amplifier comprises an optical fiber amplifier, wherein said means comprises a nonlinear optical fiber and wherein said pre-compressor comprises a pair of dispersive elements.

27. The method of claim 18, wherein said spectral broadener comprises a nonlinear optical fiber selected to preferentially attenuate light that would otherwise be generated by nonlinear stimulated Raman scattering.

28. The method of claim 18, wherein said electro-optic modulator is driven b a parabolic drive signal selected from the group consisting of (i) periodic in time, (ii) aperiodic in time and (iii) arbitrary in time.

29. The method of claim 26, wherein an optical limiter is positioned between said fiber amplifier and said means, wherein said optical limiter produces substantially uniform intensity pulses in a plurality of pulses of said amplified seed beam.

30. The method of claim 18, wherein said CW laser provides at least one wavelength within a range within a range from 1000 nm to 2000 nm.

31. The method of claim 18, wherein said at least one electro-optic modulator produces a high repetition rate seed beam having a repetition rate of at least 2 GHz.

32. The method of claim 18, wherein said at least one electro-optic modulator produces a high repetition rate seed beam having a repetition rate within a range from 1 GHz to 100 GHz.

33. The method of claim 18, wherein said short-pulse, high repetition-rate, high energy output pulses comprise a pulse duration within a range from 10 fs to 1 ps, a repetition rate within a range from 1 GHz to 100 GHz and energy within a range from 100 pJ to 1 µJ.

34. The method of claim 18, wherein said short-pulse, high repetition-rate, high energy output pulses comprise a pulse duration within a range from 10 fs to 1 ps, a repetition rate within a range from 1 GHz to 100 GHz and energy within a range from 1 µJ to 10 mJ.

35. The method of claim 18, further comprising partitioning said train of bandwidth-limited short-duration output pulses into a set of N pulselet trains.

36. The method of claim 35, further comprising amplifying and compressing each pulselet train of said N pulselet trains.

37. The apparatus of claim 36, further comprising combining each pulselet train of said N pulselet trains in interleaved manner of equal temporal spacing to produce a composite pulselet frequency.

* * * * *